United States Patent [19]

Loeblich et al.

[11] Patent Number: 4,848,675

[45] Date of Patent: Jul. 18, 1989

[54] METHOD OF GRANULATING WATER SOLUBLE FERTILIZERS WITH HIGH KIESERITE CONTENT

[75] Inventors: Karl-Richard Loeblich, Barsinghausen; Guenter Bruns, Wennigsen; Helmut Zentgraf, Burghaun-Stenbach; Ernst Czaplinsky, Sehnde, all of Fed. Rep. of Germany

[73] Assignee: Kali Und Salz Aktiengesellschaft, Kassel, Fed. Rep. of Germany

[21] Appl. No.: 198,456

[22] Filed: May 25, 1988

Related U.S. Application Data

[63] Continuation-in-part of Ser. No. 166,641, Mar. 11, 1988, abandoned.

[30] Foreign Application Priority Data

Mar. 11, 1987 [DE] Fed. Rep. of Germany ....... 3707785

[51] Int. Cl.$^4$ .............................................. B02C 19/12
[52] U.S. Cl. ......................................... 241/21; 241/24
[58] Field of Search ...................... 241/16, 22, 24, 21, 241/29; 71/28, 29, 41, 64.02, 64.03, 64.04; 23/313 R; 425/222; 264/15

[56] References Cited

U.S. PATENT DOCUMENTS

| 3,926,609 | 12/1975 | Effmert et al. ................ 71/64.04 X |
| 4,217,333 | 8/1980 | Loblich . |

FOREIGN PATENT DOCUMENTS

| 3618058 | 2/1987 | Fed. Rep. of Germany . |
| 148876 | 6/1981 | German Democratic Rep. ................................... 71/64.04 |
| 10427 | 1/1980 | Japan .................................. 71/64.04 |

Primary Examiner—Mark Rosenbaum
Attorney, Agent, or Firm—Michael J. Striker

[57] ABSTRACT

In a method of granulating kieserite or kieserite-potassium sulfate mixtures, a portion of a delivery product is milled to dust fineness, the total product with addition of a water-soluble phosphate is fully granulated, and dried to a definite residual moisture.

9 Claims, No Drawings

METHOD OF GRANULATING WATER SOLUBLE FERTILIZERS WITH HIGH KIESERITE CONTENT

CROSS-REFERENCE TO RELATED APPLICATION

This application is a continuation-in-part of application Ser. No. 166,641 filed on Mar. 11, 1988, now abandoned.

BACKGROUND OF THE INVENTION

The present invention relates to a method of granulating water soluble fertilizers with high kieserite content.

For soils impoverished in magnesium it has been recommended to use the fertilizers with kieserite and other soluble fertilizers with high kieserite content, since the magnesium ion from the water soluble magnesium sulfate hydrate is easily available for the plant roots. The modern fertilizer technique involves bringing the fertilizers in a granulated form.

The granulation of kierserite and kierserite-rich mixtures by a rolling system has been recognized as very difficult. The cause of it is the physical-chemical properties of the kieserite. The German Patent No. 3,618,058 proposes a solution in accordance with which a granulating aid means from the class of the saccharide is added to the optimal grain existing kieserite-rich granulating material. This proposal can be used not only during the rolling granulation in granulating laboratory, but also in mass production with good results.

During granulation of mass fertilizers, the price of the granulating aid means plays a considerable role. Moreover, the constant availability must also be considered. This is not the case for many saccharide containing waste products, since they are produced in different seasons and have a limited storage ability.

Therefore, there is a task, in accordance with alternative aid means for favorable influence of the formation of granules by rolling, to find a moist kieserite-rich granulating mixture which insures the strength of the granules over a long time period.

A methodical alternative to the rolling granulation is a press granulation which however in the case of kieserite-rich fertilizers in the absence of alkali chlorides encounters special difficulties. This deals with the rigidity of the crystal lattice of the crystalline kieserite particles.

For overcoming the above-mentioned difficulties it was proposed in the German Pat. No. 3,148,404 to add to the kieserite a solution of potassium sulfate or of alkali silicates, borates or phosphates before the pressing. This features leads to an improvement of the shell formation and the quality of the kieserite granulate produced by breakage of the shells. The thus obtained progress is however not sufficient to insure a lasting use of the process in this technique.

It was then attempted to transfer the experience collected during pressing to rolling granulation, despite the fact that the process of the granulation is here totally different. With the use of soldium sulfate for moist granulating mixture, a sufficient granule formation can be achieved only with a properly high dosing of the sodium sulfate. The high quantity of use is disadvantageous since in connection with the high residual moisture which must be allowed for stabilization of the binding in the granules during drying, the material content of the granules becomes sensitive. The transmission of the experience obtained during the pressing granulation to the rolling granulation has been questioned during a long time.

SUMMARY OF THE INVENTION

It has been found in a surprising manner that the formation of the granules by rolling of moisturized kieserite, in contrast to utilization of sodium sulfate as aid means for the rolling granulation, is very enhanced by extremely low quantities of alkali phosphate in the order of 2 to 6 kg per t of correct grain, and the granules dried to a residual moisture of 1-4%, in contrast to those which are produced without aid means, have a high storage stability.

Additionally it has been found that the alkali phosphate as a granulation aid means can be replaced by water soluble calcium dihydrogen phosphate. Because of its low dissolving speed, an added quantity is required which strongly depends on the grain of this aid means, and selected within 10-80 kg per t of correct grain.

The term "correct grain" is used herein to identify a product with a desired grain size or in other words with a correct grain size distribution required.

In accordance with the present invention the method of granulation comprises the steps of producing a return product by treating deficient grain to a grain size of 50-60% under 0.5 mm and 90% under 1 mm; adding to the return product a fresh mixture with a content of at least 20% of dust kieserite with a grain size of at least 50-60% under 0.063 mm in proportion to a correct grain produced and a water soluble phosphate in dose of 0.1-8% relative to the mass of the fresh mixture, so as to form a total mixture, adjusting the total mixture prior to rolling to a moisture of 9-13%; then granulating the total mixture by rolling; drying the granules to a residual moisture of 1-4%; and separating the dried granules into correct grains and deficient grains.

The alkali phosphates which can be used as suitable granulation aid means include all compositions of the sodium, potassium and in a broad sense the ammonium with dihydrogen phosphate, hydrogen phosphate and phosphate anion$^s$. The aid means on the basis of water soluble phosphate delays the too fast hydratization of finest kieserite portion in the moisturized kieserite granulating mass and slows the reaction between the components of a mixture of kieserite and potassium salts, especially potassium sulfate. These reactions are desired for rigidification of the granules, and they must not proceed so fast that they end prior to the rolling formation and the compression of the granules during further rolling.

The best action of the found aid means for the rolling granulation is achieved when the kieserite or the kieserite-rich mixture has such a grain distribution which allows the optimal structural compression during rolling. The diameter of the greatest primary particles in the granulating mixture must lie considerably below the lower limit of the correct grain region of the product.

Furthermore, sufficient finest portions must be available. A grain spectrum of the primary particles which is unsuitable for the rolling granulation, can be corrected by addition of a dust-finely milled component of the mixture in ratio of 1 part of dust to 2.5-4 parts of coarser granulating product. The dust-finely milled component, preferably dust kieserite, must go at least 50% through a sieve with mesh width of 63 μm. The return product introduced into the granulating mixture and derived from the deficient grain of the continuous granulation does not have to be subjected to such strong requirements as the fresh product in the mixture.

The method in accordance with the present invention is illustrated by the following examples.

EXAMPLE 1

306 weight parts of a kieserite with $d' = 0.4$ mm and a uniformity coefficient $n = 1.8$ are mixed in a dry state with 194 weight parts of dust kieserite with a grain size of 60% < 0.063 mm, with 5 weight parts of calcium dihydrogen phosphate monohydrate with a grain of 80% < 0.063 mm and with 414 weight parts of the return product which is produced by sifting or milling of deficient grain to a grain size of 50% < 0.5 mm, and then moisturized with 81 weight parts of water. The moist mixture is supplied to a rotatable granulating drum. During the rolling process the green (fresh moist) granules are formed, which are compressed during further rolling to green-firm spherical structures. The green granules are subsequently dried to a residual moisture of 1.5%. The dried granules are then sifted, wherein 513 weight parts of correct grain are recovered with a grain size of 1–4 mm as a final product. 372 weight parts of the granulate is produced as under corn which is returned to the process head. The 42 weight parts of over corn are milled to < 0.5 mm and also returned into the process.

The correct corn yield amounts to 55% of the theoretically possible, with respect to the whole mixture. Without granulating aid means, the correct grain yield lies at 37%. In the initial bursting strength and in wear test, there is no difference between both processes. After one day of storage time the strength of the granules produced with the phosphate is higher than those without phosphate. After 4-week storage time, the granules without phosphate have 9 N/grain bursting strength and the granules produced with calcium dihydrogen phosphate as granulating aid means has a bursting strength of 33 N/grain. In the wear test the latter show 2–3% of wear.

EXAMPLE 2

When the mixture described in the Example 1 is additionally provided with 7 weight parts of a triple superphosphate with approximately 70% of calcium dihydrogen phosphate monohydrate in a milling with a grain concentration point 0.1 mm instead of the fine-part phosphate, only a relatively weak effect is observed both with respect to the correct grain yield of the granulation which moves above 40%, and also with respect to the wear strength which after 4 weeks lies at 11%.

EXAMPLE 3

When the mixture described in the Example 1 is provided additionally with 25 weight parts of the triple superphosphate described in the Example 2, instead of the five weight parts of the fine-part calcium dihydrogen phosphate monohydrate, then practically the same results are obtained as in the Example 1. The correct grain yield lies between 50–55%, the wear lies after 4 weeks in the test at 2–3%, the bursting strength reaches almost 40 N/grain.

EXAMPLE 4

A solution of one weight part of potassium dihydrogen phosphate in 68 weight parts of water for moisterizing is added to a premixture of 438 weight parts of return product, 369 weight parts of kieserite with $d' = 0.4$ mm and 124 weight parts of dust kieserite. After the rolling and drying to the residual moisture of 2%, 504 weight parts of correct grain can be sieved between 1 and 4 mm. This corresponds to a product yield of 53% of the theoretically possible. The deficient grain is returned to the process head. After 4-week storage time of the granulated product, the bursting strength lies at 31 N/grain and the wear at 4%.

EXAMPLE 5

In the mixture of Example 4, the potassium dihydrogen phosphate is replaced with 1.5 weight parts of di-ammonium hydrogen phosphate. Practically the same results are obtained as in the previous Example.

EXAMPLE 6

A mixture of 434 weight parts of return product, 288 weight parts of potassium sulfate with a content of 51.3% of $K_2O$ and 180 weight parts of dust kieserite with a content of 27.4% $MgO$ is moisturized with a mixture of 6 weight parts of a 36% sodium dihydrogen phosphate solution and 92 weight parts of water, and rolled in the drum for granulation. The green granules are then dried to 4% residual moisture. During sifting of the dried granules, 490 weight parts of correct grain and 434 weight parts of deficient grain are produced. The correct grain yield amounts to 53%. The product has the content of 30% of $K_2O$ and 10% $MgO$.

The bursting strength lies after drying at 24 N/grain. Within 5 days it increases to 57 N/grain. The wear lies in the test at 3%. During longer storage no changes occur.

When the same mixture is granulated without the addition of phosphate as aid means, it is determined that instead of approximately 11% of green moisture for granulation depending on the temperature of the granulating mixture, 13–15% of green moisture is needed. Since the components potassium sulfate and kieserite without the phosphate react too fast with formation of double salt and the granules harden before the last forming step, the product which is produced without phosphate has a less attractive appearance than with the phosphate. Because of the rough surface of the granules produced without the aids means, the wear in the test lies 5–6% higher than for the smooth granules.

Obviously, the water soluble phosphate slows both the hydratization of the kieserite and the formation of double salt from hydratized kieserite and potassium sulfate, so that the granulating mixture provided in the correct grain size and green moisture remains plastic during the rolling process sufficiently long.

It will be understood that each of the elements described above, or two or more together, may also find a useful application in other types of methods differing from the types described above.

While the invention has been illustrated and described as embodied in a method of granulating water soluble fertilizers with high kieserite content, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of granulating kieserite and kieserite-potassium sulfate mixtures by rolling of a water-moist granulating mass, comprising the steps of producing a return product by treating deficient grain to a grain size of 50-60% under 0.5 mm and 90% under 1 mm; adding to the return product a fresh mixture with a content of at least 20% of dust kieserite with a grain size of at least 50-60% under 0.063 mm in proportion to a desired output of correct grain and a water soluble phosphate in dose of 0.1-8% relative to the mass of the fresh mixture, so as to form a total mixture; adjusting the total mixture prior to rolling to a moisture of 9-13%; then granulating the total mixture by rolling; drying the granules to a residual moisture of 1-4%; and separating the dried granules into correct grains and deficient grain.

2. A method as defined in claim 1, wherein said treating includes milling the deficient grain to a grain size of 50-60% under 0.5 mm and 90% under 1 mm.

3. A method as defined in claim 1, wherein said treating includes sifting the deficient grain to a grain size of 50-60% under 0.5 mm and 90% under 1 mm.

4. A method as defined in claim 1, wherein said separating of the dried granules includes sifting out the correct and deficient grain.

5. A method as defined in claim 1; and further comprising the step of adding to the total mixture 1-8% of calcium dihydrogen phosphate in correspondence with its fresh mixture portion.

6. A method as defined in claim 5; and further comprising the step of moisturizing the total mixture, said drying of the granules including adding dry components, said adding of calcium dihydrogen phosphate being performed prior to the moisturizing and together with the adding of the dry components.

7. A method as defined in claim 1, wherein the water soluble phosphate includes a phosphate selected from the group consisting of any alkali phosphate and ammonium phosphate with an anion selected from the group consisting of a dihydrogen phosphate anion, monohydrogen phosphate anion and phosphate anion.

8. A method as defined in claim 1; and further comprising adding to the mixture 0.2-0.6% of alkali phosphate relative to the fresh product part.

9. A method as defined in claim 8; and further comprising the step of adding a granulating water, said adding of the alkali phosphate including adding the alkali as a solution with the granulating water to the mixture.

* * * * *